(No Model.)

E. S. RICE.
BUTTER WORKER.

No. 356,791. Patented Feb. 1, 1887.

Witnesses:
Duke F. Baxter
Chas. A. Jones

Inventor
Edwin S. Rice
by Peirce & Fisher
His Attorneys

UNITED STATES PATENT OFFICE.

EDWIN S. RICE, OF GREENE, OHIO.

BUTTER-WORKER.

SPECIFICATION forming part of Letters Patent No. 356,791, dated February 1, 1887.

Application filed August 4, 1885. Serial No. 173,573. (No model.)

*To all whom it may concern:*

Be it known that I, EDWIN S. RICE, a citizen of the United States, residing at Greene, in the county of Trumbull and State of Ohio, have invented certain new and useful Improvements in Butter-Workers, of which I do declare the following to be a full, clear, and exact description, reference being had to the accompanying drawings, forming part of this specification.

My present invention has relation to the improvement of that class of butter-working devices wherein a butter-holding table is caused to revolve beneath a suitable working-roll for the purpose of expressing the buttermilk; and the primary object of my invention is to provide improved mechanism for sustaining and imparting a vertical reciprocating movement to said roll as the butter is moved beneath it by the revolving table.

In this class of devices it has been heretofore proposed to combine with the table whereon the butter was held a vertically-reciprocating paddle or pounder, by which the milk was separated from the butter, and it has also been proposed to employ, in connection with a revolving table, a fluted roller in gear with the table and caused to constantly rotate for the purpose of expressing the milk from the butter. I have discovered that by my present improved mechanism the butter can be more rapidly and effectively worked than by any construction of device with which I am familiar, for the reason that the vertically-reciprocating movement of the working-roll allows the butter to be intermittingly gathered together for renewed working, and the advantage is obtained of a combined pressure, due to the vertical movement and the rotation of the roll.

Figure 1:
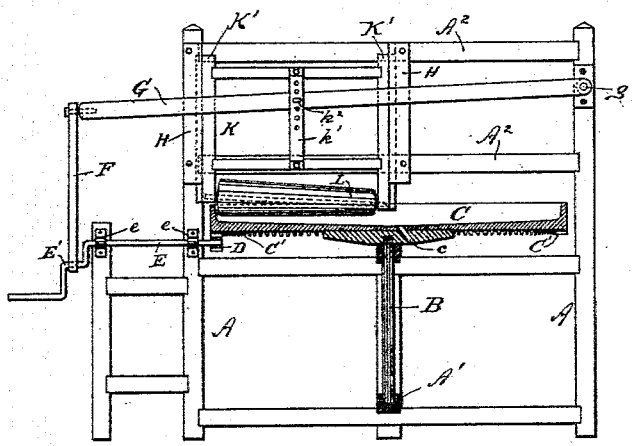
Figure 2:
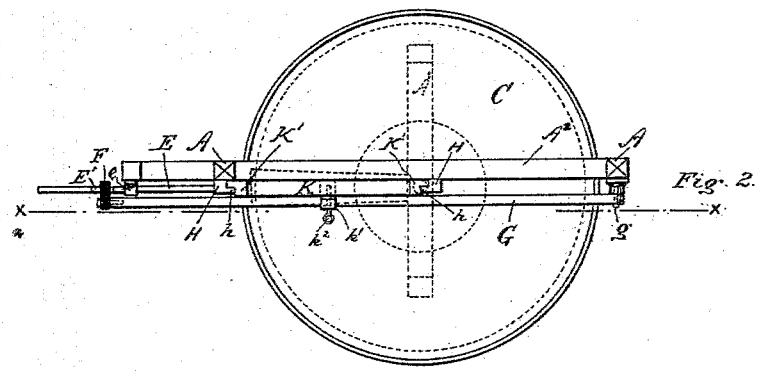
Figure 4:
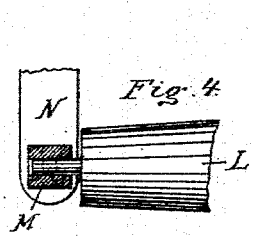
Figure 5:
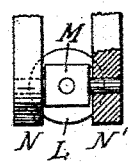
Figure 3:
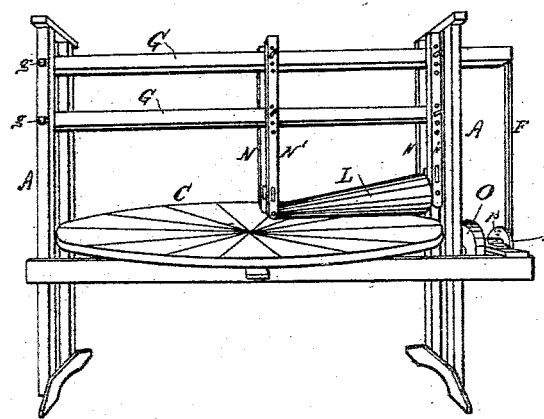

In the accompanying drawings, Figure 1 is a view in vertical transverse section on line $x$ $x$ of Fig. 2. Fig. 2 is a plan view. Fig. 3 is a perspective view of a somewhat modified construction of apparatus embodying my invention. Fig. 4 is a detail view in vertical longitudinal section. Fig. 5 is a detail end view, illustrating the journal-bearing of the working-roll shown in Fig. 3.

A designates the main frame of the machine. In the cross-frame A' is suitably journaled the vertical shaft B, which carries at its upper end the circular table C, whereon is placed the butter to be worked. This table is preferably depressed toward its center, near which point an opening, $c$, will be formed for the discharge of the milk as it is expressed from the butter.

To the under side of the table C is attached a circular rack-bar, C', with which gears the pinion D, that is driven by the crank-shaft E, and imparts the required revolution to the table. The crank-shaft E is suitably journaled in the bearings $e$ upon the main frame, and from its arm E' extends the rod F, which connects with the end of the cross-beam G, the opposite end of this beam being hinged, as at $g$, to one of the upright bars of the main frame.

Between the flanged guide rails or bars H, attached to the cross-bars $A^2$ of the main frame, is held the sliding frame K, the end bars, K', of which have reduced portions to fit beneath the flanges $h$ of the guide-rails H. In the lower end of these bars K' is journaled the working-roll L, which is preferably of conical shape, with its larger end toward the rim of the table.

It is important in practice that the working-roll be tapered, substantially as shown, instead of being straight or cylindrical. The roll is located radially across the revolving table, so as to reach successively every part of the butter passing in circuit beneath. Were the roll cylindrical each portion thereof would rotate equal lengths in any given time, whereas the parts of the table next in contact with the roll are describing arcs of unequal length, according to their distance from the center. In other words, the cylindrical roll and table would not admeasure evenly, the result being that the butter would be crowded toward the center of the table, impeding both the movement of the latter and the proper working of the butter. By tapering the roll in substantial keeping with the travel of the table, so that the parts of each in direct contact will practically admeasure equal lengths, as if in mesh, this difficulty is avoided and the butter is worked with desired regularity.

The sliding frame K is connected to the cross-beam G by means of the bar $k'$, having series of perforations therein to admit the coupling-pin $k^2$. The object in thus adjustably connecting the sliding frame to the cross-beam is to vary the position of the working-roll with respect to the table, according as the quantity of butter to be worked is large or small.

From the foregoing description the operation of my improved device will be seen to be as follows: The quantity of butter from the churn having been placed upon the table, revolution is imparted to the table by turning crank-shaft E, which also at the same time causes the sliding frame K to rise and fall, and thus impart the desired reciprocating movement to the working-roll as the butter is being moved beneath it by the table. The revolution of the table with the butter thereon causes a rotation of the roll as it presses the butter, and the reciprocation of the roll as the table revolves not only also causes an effective downward pressure on the butter, but also causes the butter to be gathered into separate heaps for renewed working, and also prevents the butter from adhering to the roll and carrying over. The milk expressed from the butter during the operation will be discharged through the opening c near the center of the table.

In the construction of apparatus shown in Fig. 3 the means of sustaining the working-roll is somewhat modified. In this case the axle of the working-roll is journaled in the boxes M, pivotally held, as seen in Fig. 5, between the upright bars N and N'. These upright bars are provided, as shown, with the series of perforations, which enable them to be adjustably and pivotally connected to the cross-beams G, that are pivotally attached at g to the end posts of the main frame. In the construction the table will be caused to revolve by means of a rack-bar and pinion, as already described, the pinion-shaft being driven by the pulley O, suitably connected with the source of power. On the outer end of the driving-shaft which carries the pulley is placed a crank-disk, P, having a series of perforations, p, therein, so that the connecting-rod F may be coupled to the disk at different points, in order to vary the extent of the vertical movement to be imparted to the working-roll. This variation of the movement of the roll is important in working different qualities of butter or at different temperatures. By sustaining the working-roll, as shown, in the swiveled journal-boxes the roll is allowed to move slightly from a horizontal position, to accommodate the slightly-swinging movement of the uprights as the cross-beams are lifted about the points g as centers.

It will be readily understood that the details of construction above set out may be varied within wide limits, and that various other means of imparting the desired reciprocating motion to the working-roll, without departing from the scope of my invention, may be employed.

Heretofore in washing-machines having a revolving tub to contain the clothes beater-rolls of cylindrical shape have been provided, which descended in vertical ways with quick blows against the clothes. In my device a table which permits the buttermilk to drain constantly away is used in lieu of the closed tub of the washing-machine. The working-roll descends gradually into the butter, and is not driven thereinto by sudden impact, as with the beater-roll, which latter movement is not adapted to squeeze out the buttermilk, and, in addition, must break the grain of the butter and reduce it to paste-like condition. Moreover, the working-roll is tapered to conform to the travel of the table instead of being cylindrical, as in the case of the beater-roll. The advantage of this peculiarity in contour of the working-roll has already been pointed out, and is indeed of itself an old expedient in butter-workers; but I am not aware that, prior to my invention, such tapered roll has been caused to reciprocate with gradual movement to and from the butter spread upon the revolving table, whereby the butter could be pressed and rolled simultaneously after the manner of kneading, to thoroughly force out the buttermilk without injuring the grain of the butter.

Having thus described my invention, what I claim as new, and desire to secure by Letters Patent, is—

1. In a butter-worker, the combination, with the open revolving table to hold the butter and permit the escape of the milk therefrom, of the working-roll described, the journal-supports for said roll, and the means, substantially as described, for reciprocating said supports.

2. In a butter-worker, the combination, with the revolving butter-holding table, of the butter-working roll, the uprights for sustaining said roll, the cross beam or beams, the connecting-rod, and the driving-shaft, substantially as described.

3. In a butter-worker, the combination, with the revolving butter-holding table, of the butter-working roll, the uprights for sustaining said roll, the cross-beams in adjustable connection with said uprights, the connecting-rod, and driving-shaft, substantially as described.

4. In a butter-worker, the combination, with the revolving table, of the vertically-reciprocating working-roll, the uprights for sustaining said roll, the cross-beams, and a connecting-rod and driving-shaft, said rod and shaft being adjustably connected, substantially as described.

5. In a butter-worker, the combination, with the revolving table, of the working-roll, the uprights for sustaining the said roll, the pivoted cross-beams connected to said uprights, and a connecting-rod and driving-shaft, substantially as described.

6. In a butter-worker, the combination, with the revolving butter-holding table, of the vertically-reciprocating working-roll journaled in swiveled bearings, the pivoted uprights for sustaining said roll, the cross beam or beams, the driving-shaft, and suitable connecting mechanism, substantially as described.

EDWIN S. RICE.

Witnesses:
W. E. HARRINGTON,
C. Z. PECK.